Jan. 29, 1946.　　　G. W. HUGHES ET AL　　　2,393,777
TOOL
Filed April 5, 1944
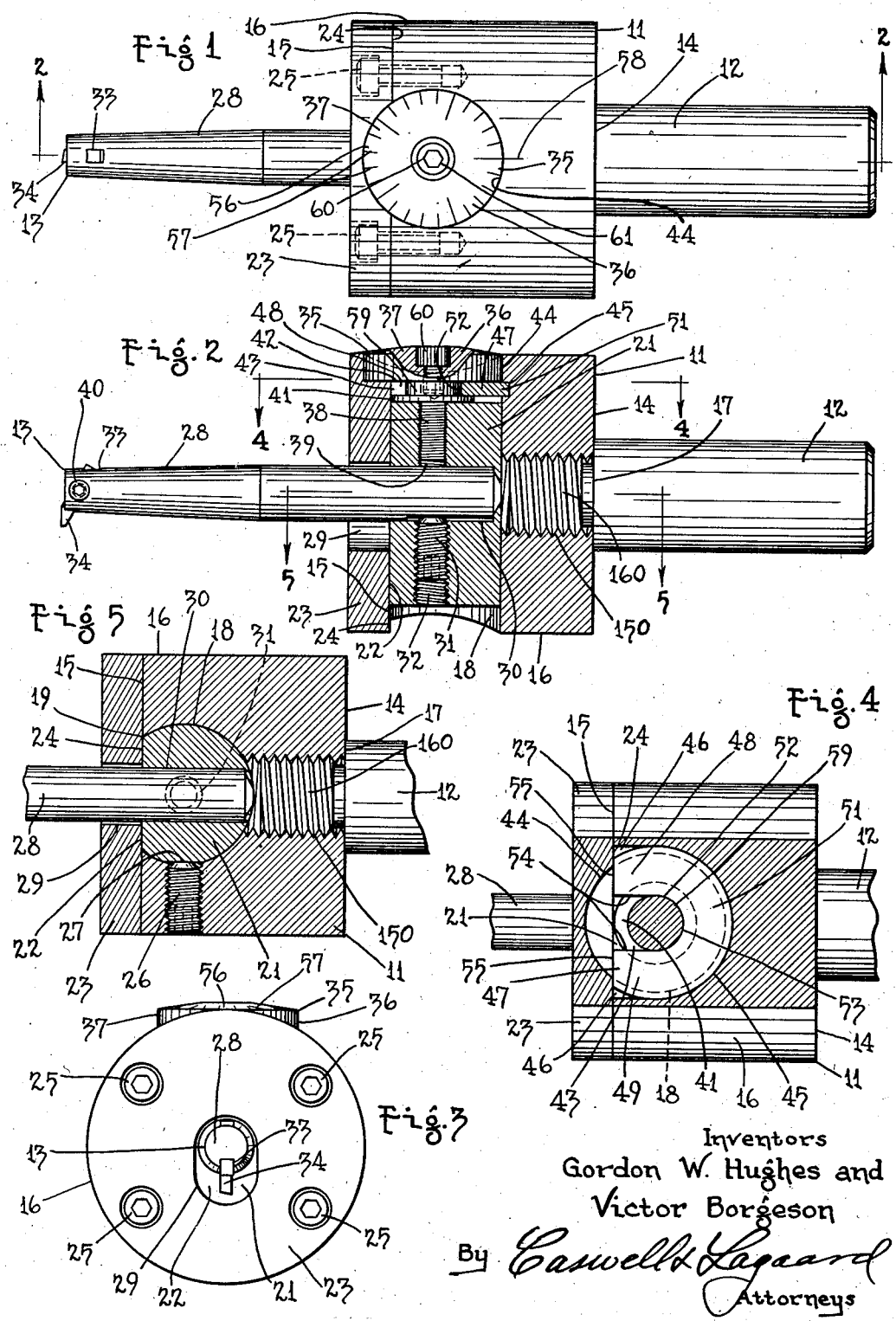
Inventors
Gordon W. Hughes and
Victor Borgeson
By Caswell & Lagaard
Attorneys Patented Jan. 29, 1946

2,393,777

UNITED STATES PATENT OFFICE 2,393,777

TOOL

Gordon W. Hughes and Victor Borgeson, Minneapolis, Minn.

Application April 5, 1944, Serial No. 529,617

4 Claims. (Cl. 279—6)

Our invention relates to tools and particularly to boring tools and has for an object to provide a boring tool in which transverse adjustment of the tool may be had relative to the support to which the tool is attached.

An object of the invention resides in providing a tool having a body with a shank issuing outwardly therefrom and by means of which the tool is supported, and in further providing in said body a cross-slide to which the cutting means is attached, said cross-slide being mounted for transverse movement relative to the axis of the shank.

Another object of the invention resides in constructing the head with a bore substantially cylindrical in cross section extending transversely of the axis of the shank and in which the cross-slide of substantially the same cross sectional shape is mounted for transverse movement.

Another object of the invention resides in constructing said body with an opening disposed at a locality opposite said shank and extending along and communicating with said bore and in further providing said cross-slide with a non-circular longitudinally extending portion disposed adjacent said opening.

A feature of the invention resides in providing means situated at the locality of said opening for engagement with the non-circular portion of the cross-slide and for holding the cross-slide from rotation.

Another object of the invention resides in attaching the cutting means to said cross-slide and in causing said cutting means to extend through the opening in the body.

Another object of the invention resides in providing a cap for the body adapted to close the opening therein, said cap having means thereon for engagement with the non-circular portion of the cross-slide to hold the same from rotation.

An object of the invention resides in providing said cap with an elongated opening through which the cutting means extends.

A feature of the invention resides in providing a micrometer adjustment for moving said cross-slide longitudinally along said bore.

An object of the invention resides in providing means for restraining said adjusting means from longitudinal motion, said means being held in position by said cap.

Other objects of the invention reside in the novel combination and arrangement of parts and in the details of construction hereinafter illustrated and/or described.

In the drawing:

Fig. 1 is a plan view of a boring tool illustrating an embodiment of our invention.

Fig. 2 is an elevational sectional view taken on line 2—2 of Fig. 1.

Fig. 3 is an end elevational view of the structure shown in Fig. 1.

Fig. 4 is a fragmentary plan sectional view taken on line 4—4 of Fig. 2.

Fig. 5 is a fragmentary plan sectional view taken on line 5—5 of Fig. 2.

In the use of boring tools where the same are employed in connection with turret lathes, screw machines and similar machine tools and where the tool is mounted in the turret, tail stock or where the tool is carried by the live spindle and used for boring a structure carried by the carriage of a regular screw cutting lathe, adjustment of the diameter of the bore has usually been made through movement of the cutting bit. This is exceedingly cumbersome and inaccurate and makes it impossible to accurately and repeatedly reproduce the same bore in various pieces, or to take several cuts of predetermined depth with the same tool. The present invention provides an extremely simple and practical construction whereby sufficient adjustment of the cutting bit of the boring tool may be procured without loosening the bit in the supporting bar and where the same adjustment may be easily and accurately procured so as to permit of accurate adjustment and repeated resetting of the tool to close tolerances.

Inasmuch as the invention may be used with any type of turret lathe, screw machine or other similar machine tool, the construction of the machine with which the tool is used has not been shown in the drawing, though the use of the tool in conjunction with such machine will be readily comprehended.

Our invention comprises a body 11 having a shank 12 attached thereto at one end and carrying at its other end cutting means indicated in its entirety by the reference numeral 13. These various parts will now be described in detail.

The body 11, which is best shown in Figs. 2 and 4, consists of a cylindrical block of metal having a rear surface 14, a face 15 and a cylindrical surface 16. The body 11 is bored through the rear surface 14 and tapped, as indicated at 150, to receive a threaded stub 160 formed on the end of the shank 12. The shank 12 is constructed with a shoulder 17 which fits up against the surface 14 and securely holds the body attached to the shank. In the drawing, we have shown a cylindrical shank, though it can be readily comprehended that tapered shanks or any other type of shank or connection, such as is now used for the purpose, may be employed in place of the shank illustrated. Where it becomes desirable, the shank may be also formed integral with the body in which case the stud 160 and the threaded bore 15 are dispensed with.

The body 11 is constructed with a bore 18 which extends transversely with respect to the axis of the shank 12 and which is located at the face 15 of said body. The distance between the axis of the bore 18 and the face 15 of the body 11 is less than the radius of the said bore, so that the bore opens through the face 15 at the end of the body opposite the shank 12. In this manner, a longitudinally extending opening 19 is formed in the body 11 which is parallel with the axis of the bore 18 and which communicates with said bore.

Slidably mounted in the bore is a cross-slide 21 which is constructed with a flat 22 parallel with the axis of said cross-slide and the bore 18. This flat is substantially coplanar with the face 15 of the body 11.

Secured to the outer end of the body 11 is a cap 23 which is constructed with a surface 24 adapted to overlie the face 15 of said body. This cap is rigidly secured to the body 11 by means of a number of cap screws 25 which extend through said cap and are threaded into said body as shown in Figs. 1 and 3. The surface 24 of the cap 23 bears against the flat 22 on the cross-slide 21 and prevents rotation of said cross-slide. The cross-slide 21 is thus mounted for transverse movement relative to the axis of the shank 12 and within the bore 18 and is held from rotational movement with respect thereto.

For the purpose of locking the cross-slide 21 from movement within the bore 18, a set screw 26 is employed which is threaded into the body 11 with its axis extending at right angles to the axis of the cross-slide 21. This set screw engages a flat 27 formed on the cross-slide 21, whereby any burr set up by the set screw does not cause binding of the cross-slide within its guideway formed by the bore 18.

The cutting means 13 comprises a boring bar 28 which extends through an elongated slot 29 in the cap 23 which registers with the opening 19. The said bar 28 is received in a bore 30 in the cross slide 21 which bore is transverse with respect to the axis of said cross-slide and parallel with the axis of the shank 12. The boring bar 28 is held in position within the bore 30 by means of a set screw 31 which is screwed into a threaded hole 32 formed in one end of the cross-slide 21. The set screw 31 is accessible through the lower end of the bore 18 which opens outwardly through the lowermost portion of the body 11.

The extreme end of the boring bar 28 is formed with a diagonally extending hole 33 in which is positioned the cutting bit 34. Said bit is held in adjusted position with the hole 33 by means of a set screw 40 threaded into said boring bar. In the particular construction shown, the hole 33 is arranged diagonally so that the cutting edges of the bit 34 may bore to the end of the bore being machined, as well as along the cylindrical surface thereof.

The cross-slide 21 may be moved transversely of the axis of the shank 12 by means of a micrometer adjustment indicated in its entirety by the reference numeral 35. This adjustment consists of a micrometer screw 36 having a disk-like head 37 and a threaded shank 38 extending outwardly therefrom. The shank 38 screws into threads 39 formed in the upper end of the cross-slide 21 and concentric with the axis of the said slide. Adjacent the head 37 of micrometer screw 36 is provided a collar 41 which is spaced from the under surface 42 of the head 37 to provide a groove 43 therebetween and a short stem 59 at the inner portion of said groove. The head 37 is received in a socket 44 formed partly in the cap 23 and partly in the body 11 and, if desired, the diameter of the head 37 may be the same as the diameter of the cross-slide 21 in which case the portion of the socket 44 in the body 11 forms a continuation of the bore 18. In the body 11 only is provided an undercut groove 45 which is formed by boring the said body at the same time the bore 18 is formed. This undercut groove extends through the face 15 of the body, but not into the cap 23. The corners of said groove where the same lie in proximity to the face 15 are milled out, as indicated at 46 in Fig. 4, so that the sides of said groove are parallel up to a plane extending transversely of the axis of the shank 12 and containing the axis of the cross-slide 21.

Disposed within the groove 45 is a horseshoe-shaped key 47 having spaced legs 48 and 49 and a circular connecting portion 51. This key is constructed with an opening 52 through the same semi-circularly at one side, as indicated at 53 and with spaced parallel edges 54 extending through the end of said key. The ends 55 of the legs 48 and 49 of the said key are flat and in a common plane which is disposed substantially the same distance from the axis of the semi-circular portion 53 of opening 52 as the distance between the axis of the cross-slide 21 and the axis 15 of body 11.

The head 37 of screw 36 has its outer surface 56 disposed substantially at the surface 16 of body 11 and is constructed with a number of graduations 57 which are calibrated with reference to the pitch of the threads of the threaded shank 38, so as to indicate fractions of an inch, movement of the cross-slide 21 when the screw 36 is rotated. For cooperation with the graduations 57, a mark 58 is formed on the surface 16 of the body 11 which is adapted to successively register with any of said graduations.

To facilitate rotation of the screw 36 of the micrometer adjustment 35, a hollow head cap screw or similar screw 60 having a hexagonal socket 61 in the same is screwed into the head 37 of said screw. This cap screw is forced into the head 37 so that the same does not turn relative thereto after it has once been inserted. By means of this cap screw, a hexagonal socket is provided for the micrometer screw 36 whereby the screw 36 may be rotated by applying a suitable wrench in said socket.

The method of assembling the device is as follows: The cross-slide 21 is inserted into the bore 18 of body 11 from either end thereof with the flat 22 coplanar with the face 15 of body 11. The micrometer screw 35 is next inserted into the socket 44 and the shank 38 screwed into the threads 39 of the cross-slide 21. The head 37 is so located that the groove 43 registers with the undercut 45. The horseshoe-shaped key 47 is next inserted into this groove with the legs 48 and 49 directed toward the shank 12. As soon as the semi-circular portion 53 of opening 52 reaches the stem 59 of screw 36, the said key is rotated in the undercut 45 until the ends 55 of the legs 48 and 49 lie in the plane of the face 15 of the body 11. The cap 23 is next applied and rigidly secured to the body 11 by means of the cap screws 25. The boring bar 28 is next inserted through the slot 29 and through the opening 19 into the bore 30 of the cross-slide 21. By means of the set screw 31, this boring bar is held in the proper position. The device is now ready for use.

Inasmuch as the manner of using boring tools is well known in the art, the same will not be described in this application, though it can readily be comprehended that the tool may be put to any of the numerous uses to which similar tools are adapted.

The advantages of our invention are manifest. The tool is extremely simple in construction and easy to manufacture and can be constructed at a nominal expense. The tool is sturdy and rigidly supports the boring bar so that chattering or uneven cutting is entirely eliminated. When the tool is inserted into the tool holder of the lathe or other machine with which it is to be used and with the axis of the cross-slide extending vertically, the head 37 of the micrometer adjustment 35 is readily accessible and adjustment can be easily and quickly made.

Changes in the specific form of my invention, as herein described, may be made within the scope of what is claimed without departing from the spirit of our invention.

Having described our invention, what we claim as new and desire to protect by Letters Patent is:

1. A tool comprising a body, attaching means at one end of said body, said body having a bore therein partly cylindrical in form and extending transversely of said body, and a face opposite said attaching means intersecting said bore to form a longitudinally extending opening communicating with said bore, a cross-slide having a cross section corresponding with said bore and mounted for transverse movement in said bore, said cross-slide having a flat arranged substantially in coplanar relationship with the face of said body, a cap secured to said body and engaging said flat to restrain rotation of said cross-slide in said bore, and means for moving said cross-slide longitudinally in said bore.

2. A tool comprising a body, attaching means at one end of said body, said body having a bore therein extending transversely of said body, and a face opposite said attaching means intersecting said bore to form an opening communicating with said bore extending in the same direction as said bore, a cross-slide mounted for transverse movement in said bore, said cross-slide having a flat arranged substantially in coplanar relationship with the face of said body, a cap secured to said body and engaging said flat to restrain rotation of said cross-slide in said bore, a screw, threads in said cross-slide engageable with said screw, said screw having a groove therein, an undercut formed in said body disposed in coplanar relationship with said groove, a horseshoe shaped key received within said groove and undercut and arranged with its legs extending away from said shank, the ends of the legs of said key being arranged in substantially coplanar relationship with respect to the face of said body, said cap engaging the ends of the legs of said key to hold the key in position within said undercut.

3. A tool comprising a body, attaching means at one end of the body, said body having a transverse hole therein forming a guideway, a cross-slide mounted for sliding movement in said guideway and restrained from rotational movement therein, a screw, threads in said cross-slide engageable with said screw, said screw having a groove therein, an undercut formed in said body and encircling said screw, and a key disposed in both said groove and undercut.

4. A tool comprising a body, said body having a transverse hole therein forming a guideway and a face opposite said attaching means intersecting said hole to form an opening communicating with said hole, a cap attached to said face and covering said opening, a cross-slide mounted for sliding movement in said guideway, a screw, threads in said cross-slide engageable with said screw, said screw having a groove therein, an undercut formed in said body and encircling said screw, said undercut extending through said face at said opening, and a key insertable into said undercut through said opening, said cap holding said key in operative position.

GORDON W. HUGHES.
VICTOR BORGESON.